May 5, 1942.

T. G. HARE 2,281,689

VALVE STRUCTURE

Filed Sept. 4, 1941

INVENTOR.
Terence G. Hare
BY
Barnes, Kisselle, Laughlin & Raisch
Attorneys.

Patented May 5, 1942

UNITED STATES PATENT OFFICE 2,281,689

VALVE STRUCTURE

Terence G. Hare, Ypsilanti, Mich.

Application September 4, 1941, Serial No. 409,511

6 Claims. (Cl. 251—46)

This invention relates to a valve for the controlling of the flow of fluids, and it has to do particularly with a sealing structure in a valve where a rotary stem is advanced toward and away from a seat.

The principal object of the invention is to provide an improved structure wherein an antifriction bearing involving rolling elements is disposed between the stem and the sealing member so that when the stem is advanced toward the seat while it is rotating, the sealing member contacts the seat but does not rotate relative thereto. A further object of the invention is to provide an arrangement in which the standard or conventional sealing washer may be employed, so that notwithstanding the fact that an antifriction bearing structure is employed, the sealing washer may be replaced in the usual manner. A further object of the invention is to provide a construction especially designed for original equipment for valves; that is to say, newly manufactured valves may be designed for and equipped with the sealing structure, although it is to be understood that the sealing structure is not necessarily limited to original equipment. A construction for carrying out the invention is disclosed in the accompanying drawing wherein:

Figure 1:
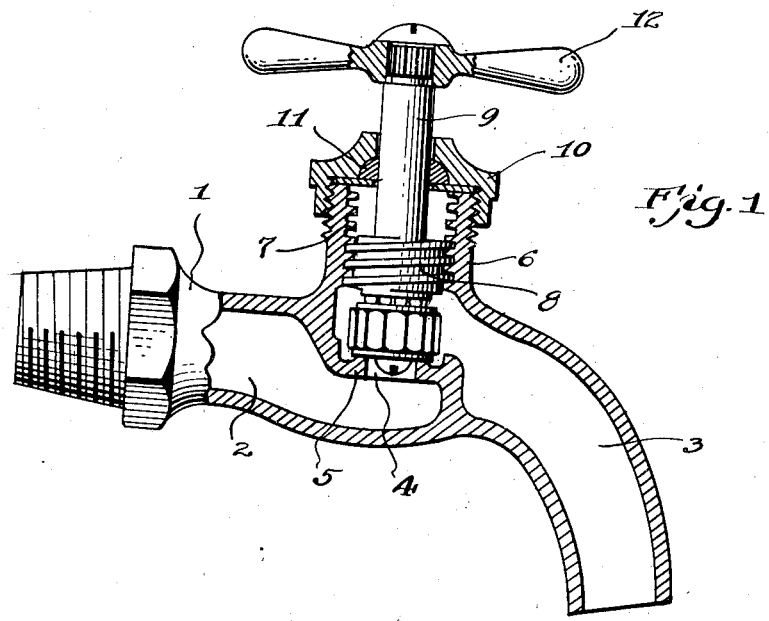
Fig. 1 is a cross sectional view showing a valve constructed in accordance with the invention.

A faucet or valve, as generally illustrated in Fig. 1, has a body 1 with a passage 2 connected to a source of supply of fluid such as water, steam, air or the like, and an outlet spout or passage 3. Between the passages 2 and 3 is a valve passage 4 defined by a seat 5. The valve has an extension 6 in axial alignment with the seat and is provided with internal threads 7 in which the enlarged threaded portion 8 of a valve stem 9 is threaded. A cap 10 is threaded to the enlargement 6 and a suitable gasket or packing 11 surrounds the stem. The stem is equipped with an operating handle 12. The valve structure thus described is more or less conventional, and it will be observed that as the stem is turned it is fed toward and away from the seat by the threads 7.

Figure 2:
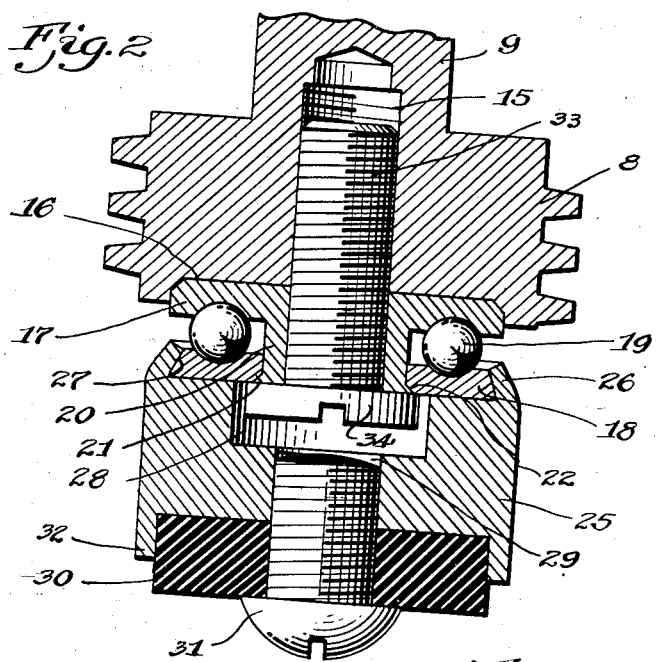
Fig. 2 is an enlarged cross sectional view taken through the valve stem and the antifriction bearing and sealing washer.

The antifriction bearing and the sealing washer are mounted on the inner end of the stem so that the sealing member or washer is caused to close against the seat 5 and to be moved therefrom as the controlling stem is rotated. This is shown in Fig. 2. The stem is provided with a threaded bore 15 and it may have a recess formation 16 on its end surrounding the bore for the reception of a race member 17. A lower race member is illustrated at 18 while between the race members are antifriction rolling elements preferably in the form of balls 19. The bearing including the two races and the interposed balls are preferably mounted so as to remain in assembly when detached, and to this end an interconnecting means is provided between the races. As shown, this means takes the form of a collet 20 which may be formed integral with one of the races, this being the upper race as shown herein. This collet extends through a central aperture in the lower race and the metal thereof is fashioned over in rivet-like fashion, as shown at 21, for accommodating which the central aperture in the lower race may have a counterbored or flared portion 22. The fashioning of the metal at 21 is such as to not bind the races against relative rotation, but it prevents a separation of the races so that the balls are held in assembly therewith. The reference to the races as upper and lower races is only for convenience—this being the relative locations of the races as viewed in the drawing.

A washer holding member having a substantial body of metal as illustrated at 25 is recessed so as to form a flange 26. The lower race 18 is received in the recess and then the metal of the flange 26 is spun or fashioned into interlocking relationship with the lower race. To this end the lower race may have a tapered edge formation as at 27 over which the flange 26 is formed, and in this manner the body 25 and the bearing are permanently united. Of course, the parts may be separated, but in the normal usage of the structure, the body 25 and the lower race are designed to remain joined.

The body 25 also has a recess 28, the purposes of which will presently appear, and this recess is preferably centrally disposed on the axis of the parts. The member 25 also has an internally threaded opening 29 extending therethrough preferably on the axial center, and its lower end is adapted to receive the conventional sealing washer 30 through which a holding screw 31 is passed and threaded in the opening 29. The body 25 may have a recess formation on its lower end for receiving the washer 30, the recess formation providing a circumferential flange 32 for embracing the periphery of the washer 30. It will be noted that the washer 30 is of the standard or conventional type and may be mounted and dismounted or replaced in the conventional manner through the means of the screw 31.

For the purpose of mounting the bearing and seal structure to the stem, a screw 33 is positioned so as to extend through the collet and it has a head 34 positioned in the recess 28. The head of the screw is accessible, for the turning of the same, through the aperture 29 in the holding member, it being understood that a suitable tool, such as a screw-driver, is passed through the aperture. The head of the screw clamps the collet against the end of the stem, leaving the lower race free to turn. The upper and lower races with the interposed balls, the holding member 25 and the screw 33 are preferably manufactured as a complete sub-assembly. The screw 33 is positioned before the body 25 is attached to the lower race. This sub-assembly may or may not include the sealing washer and its holding screw 31, as elected. To mount the sub-assembly the screw 33 is threaded into the bore of the stem until it is tight, and then the screw 31 may be positioned for holding the washer.

After this construction is placed into use the sealing washer may be replaced in the usual manner, and this is made feasible because the washer 30 is of the standard type and available in many stores. The bearing structure may last for an indefinite time and need not ordinarily be replaced, but it can be replaced by first removing the washer 30 and then removing the holding screw 33. When the valve port 40 is closed by the sealing washer 30, the fluid in the passage 2, which is ordinarily under pressure, has no access to or through the bearing since the washer 30 seals against the screw and the bottom of the holding member 25 in the usual manner. The parts such as the body member 25 and the screws may be made of the material capable of resisting corrosion under conditions of use, which material is ordinarily brass. The races are preferably made of brass having harder characteristics than the other parts in order to provide suitable raceways for the balls. The balls may be made of a corrosion-resisting material such as a copper-nickel alloy in proportions substantially those of the metal known as Monel.

I claim:

1. In a valve having a seat and a control stem mounted on threads for movement toward and away from the seat, said stem having a threaded bore therein, a race member disposed adjacent the end of the stem, a second race member, balls between the race members, a collet having one end associated with one race member and the other end connected to the other race member for holding the race members and balls in assembly, a holding member having a connection with the second race member of a permanent type and having a threaded aperture adapted to receive the holding screw for a sealing washer, and a screw extending through the collet for threaded engagement in the bore of the stem to secure the race and ball assembly to the end of the stem, said screw having a head between the second race member and the holding member and which is accessible through the threaded aperture in the holding member for the turning of the same.

2. In a valve having a seat and a control stem mounted on threads for movement toward and away from the seat, said stem having a threaded bore, a race member disposed against the end of the stem, a second race member, balls between the race members, and axially positioned collet for holding the race members and balls in assembly and having a rotatable connection with one of the race members, a holding member connected to the second race member in a relatively permanent manner and substantially overlying the same and having an axially disposed threaded aperture adapted to receive the holding screw of a sealing washer, a screw extending through the collet for threaded engagement with the bore in the stem to secure the race and ball assembly to the stem, said screw having a head confined between the second race member and the holding member and which is accessible through the threaded aperture in the holding member for the turning of the screw.

3. In a valve having a seat and a control stem mounted on threads for movement toward and away from the seat, an antifriction bearing including two race members with balls therebetween with one race member positioned against the end of the stem, means for holding the race members and balls in assembly, an axially disposed headed screw passing through the races and threaded into the stem, the said means taking the thrust of the head of the screw whereby the balls are relieved of such thrust, a holding member having a connection of a relatively permanent type with the race member remote from the stem and covering the head of the screw, said holding member having a threaded aperture therein in alignment with said screw for the reception of the holding screw of a sealing washer, the first named screw being accessible through the threaded aperture for the turning of the same.

4. As a new article of manufacture, an antifriction mounting for a sealing member for a rotary control stem of a valve comprising, two race members with balls therebetween, means for holding the race members and balls in assembly, a headed element passing through the race members and adapted to be secured to the stem, a holding member secured to one race member in a relatively permanent manner and covering the head of the element, said holding member having an aperture adapted to receive a holding device for a sealing washer, said aperture being in alignment with the headed element and through which aperture the headed element is accessible for the manipulation of the same to secure it to the stem.

5. As a new article of manufacture, an antifriction mounting for a sealing member for a rotary control stem of a valve comprising, a race member adapted to be positioned against the end of the stem, a second race member, balls between the race members, a collet connecting the race members for holding the race members and balls in assembly, a headed screw passing through the collet for securing the race members and balls to the end of the stem, and said collet adapted to take the compressive forces of the screw, a holding member comprising a body of metal secured to the second race member and covering the head of said screw, said holding member being adapted to receive a sealing washer and having an aperture therethrough for receiving an element for holding the washer, the head of the screw being accessible through the aperture for the turning of the same.

6. As a new article of manufacture, an antifriction mounting for a sealing member for the rotary stem of a valve comprising, a race member adapted to be positioned against the end of the stem, a second race member, balls between the race members, a collet connecting the race members and holding them in assembly with the balls, a holding member connected to the second race member in a relatively permanent manner and adapted to hold a sealing washer and having an aperture in alignment with the collet for the reception of a holding element for the washer, and a screw passing through the collet for attaching the mounting to the stem and having its head disposed between the second race member and the holding member and which is accessible for the turning of the same through the aperture in the holding member.

TERENCE G. HARE.